Oct. 29, 1968  R. R. HOLBROOK  3,408,003
ODOMETER
Original Filed April 9, 1964  4 Sheets-Sheet 1
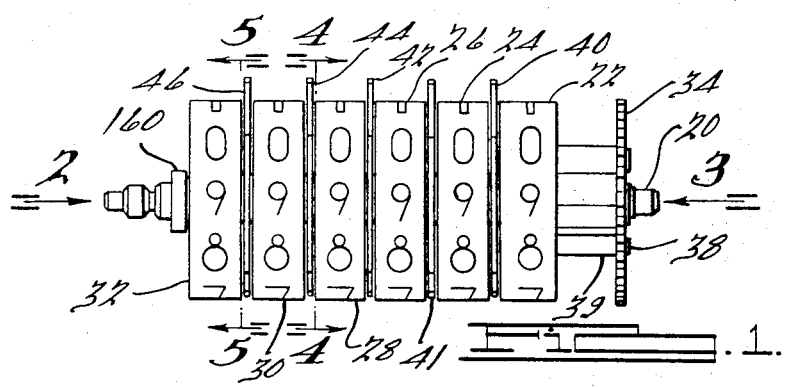
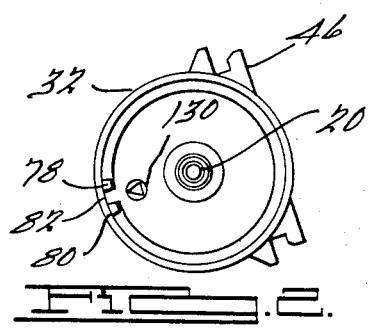
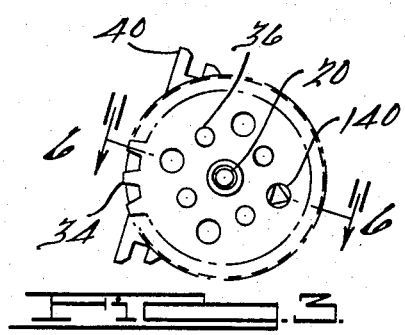
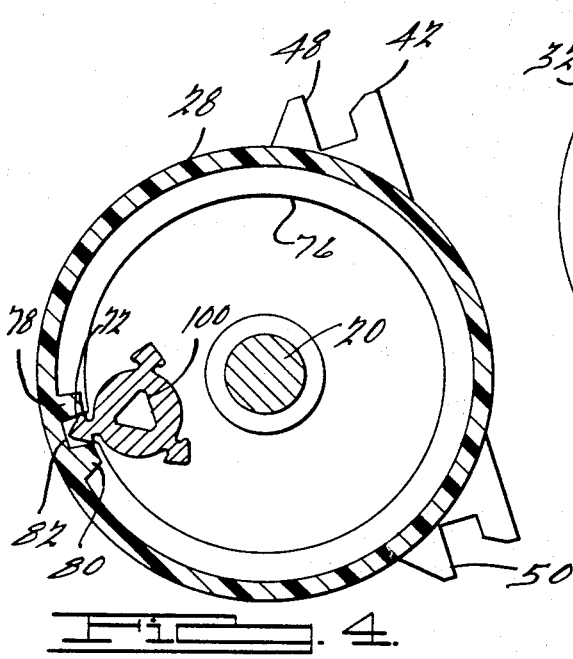
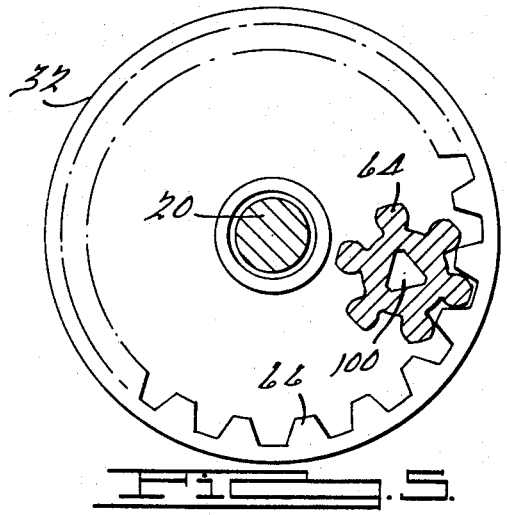
INVENTOR.
Rex R. Holbrook.
BY
Hamess, Dickey & Pierce
ATTORNEYS

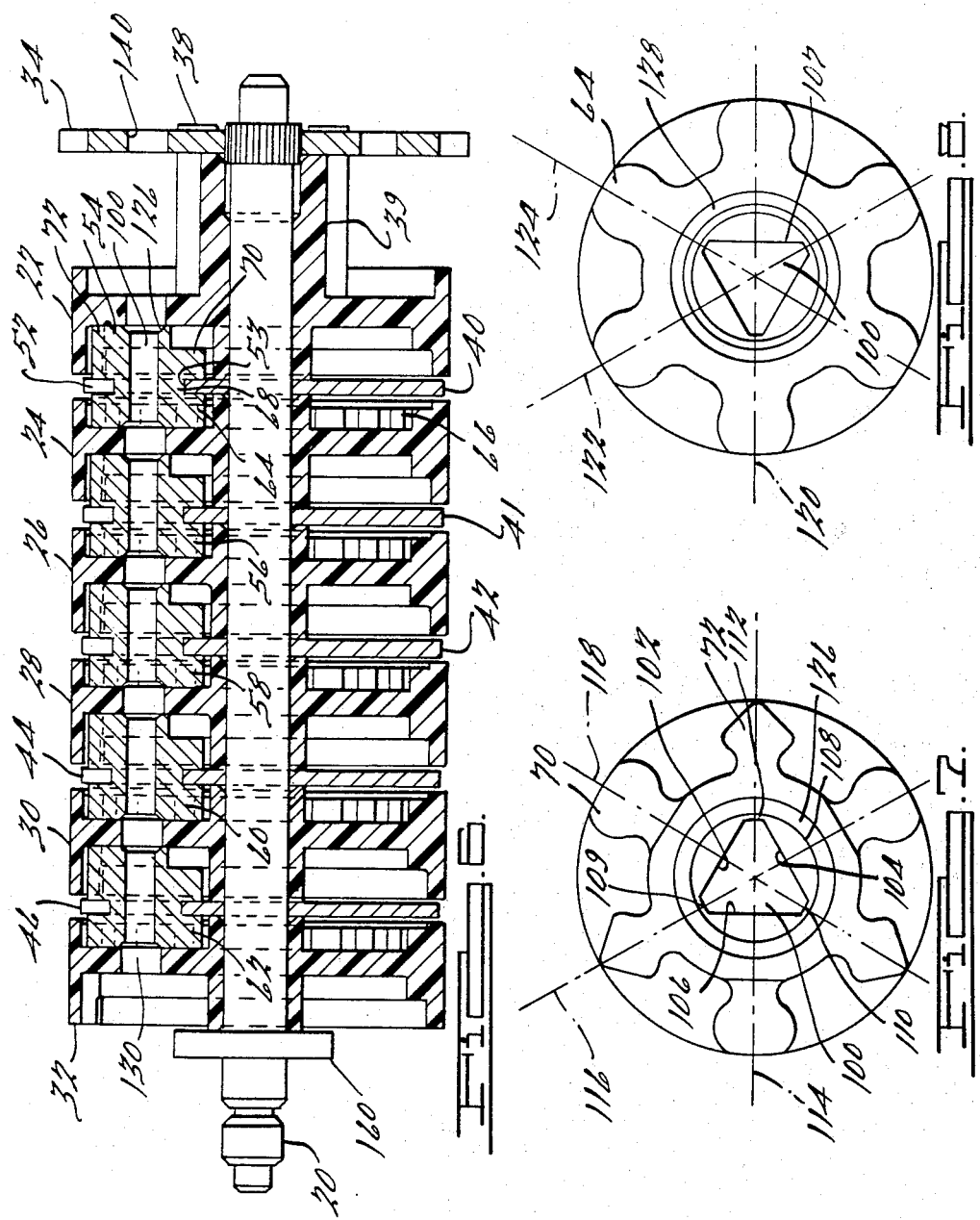

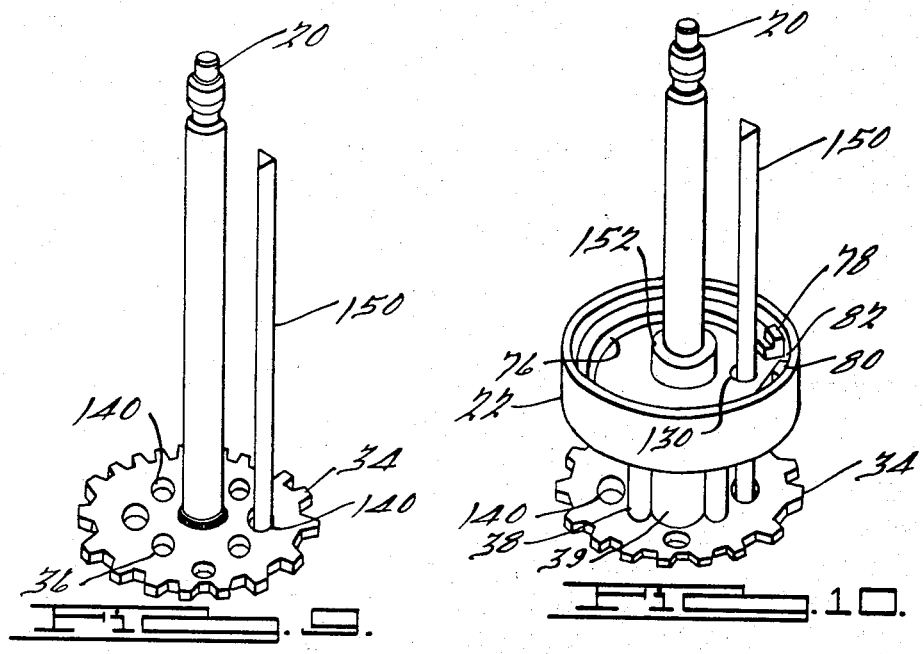
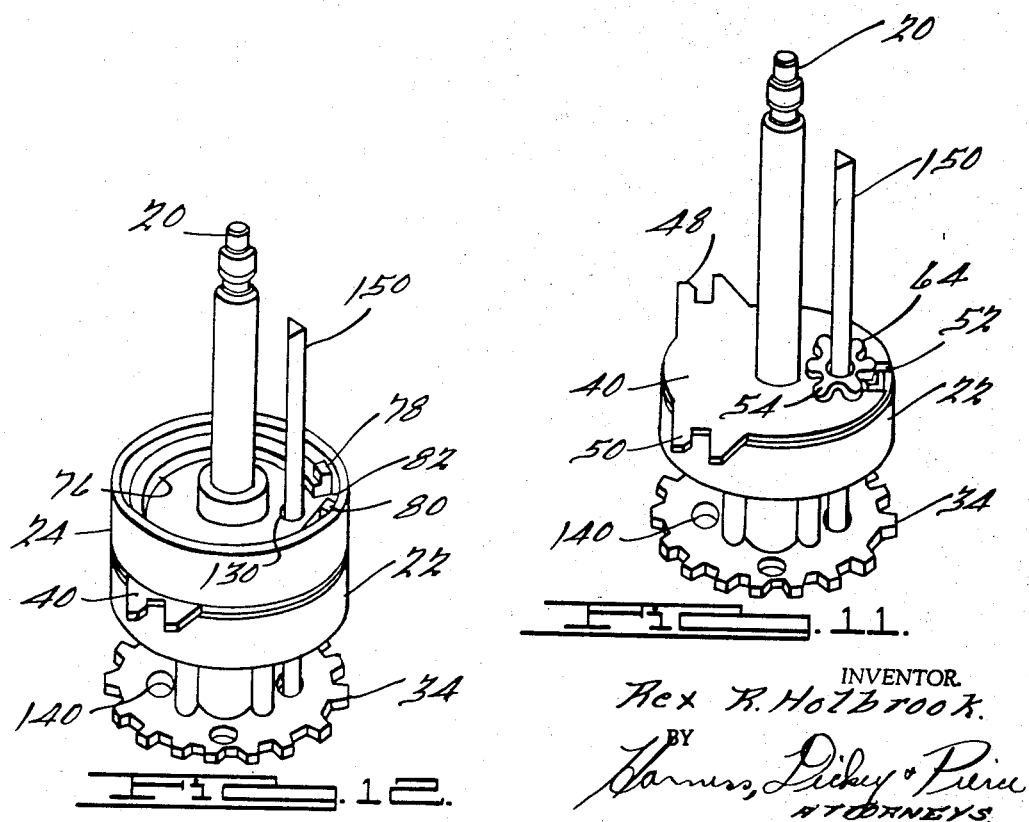

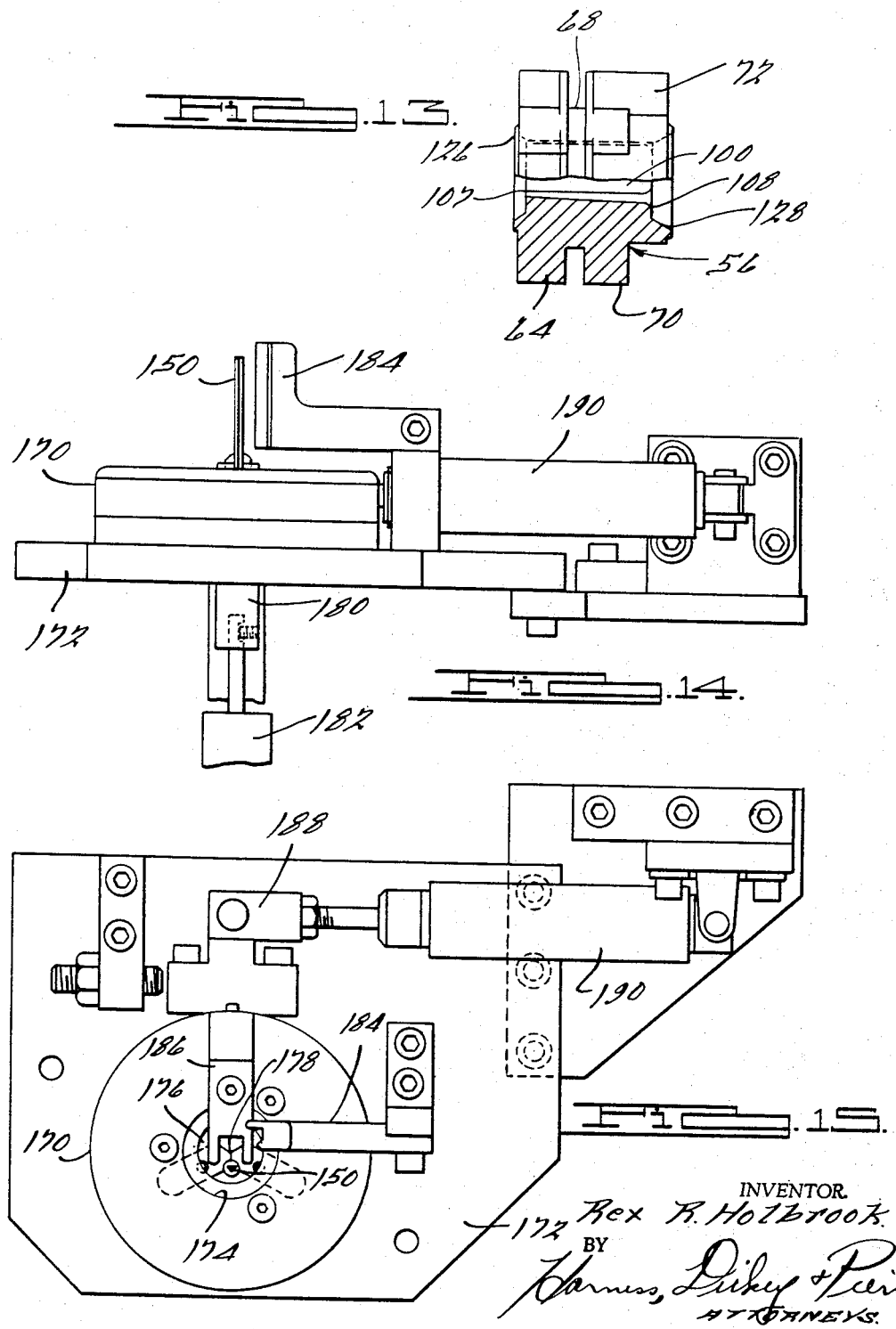

United States Patent Office 3,408,003
Patented Oct. 29, 1968

3,408,003
ODOMETER
Rex R. Holbrook, Ann Arbor, Mich., assignor, by mesne assignments, to Chrysler Corporation, Highland Park, Mich., a corporation of Delaware
Continuation of application Ser. No. 358,494, Apr. 9, 1964. This application Apr. 26, 1967, Ser. No. 638,181
26 Claims. (Cl. 235—96)

ABSTRACT OF THE DISCLOSURE

There is herein disclosed an odometer in which alignment holes are provided in the drive pinions and rotatable indicating elements to enable the odometer to be assembled in an initial zero indicating condition and to insure proper alignment of the drive pinions relative to the indicating elements.

---

This invention relates to odometers and more particularly to assembly means therefor. This application is a continuation of my prior application Ser. No. 358,494 filed Apr. 9, 1964, now abandoned.

Odometers of the type to which this invention relates are well known and have been utilized by the automotive industry and others for a number of years. The general details of construction and operation are disclosed in such United States patents as, for example: Berge 1,482,596, Feb. 5, 1924; Dinsmore 1,692,489, Nov. 20, 1928; Zubaty 1,919,493, July 25, 1933; and Helgeby, et al., 2,117,024, May 10, 1938.

Odometer devices of the type to which this invention relates comprise a plurality of indicating rolls each of which has numerals from zero to nine equally spaced about the periphery. Each of the rolls is suitably connected to the next adjacent roll by a transfer mechanism which causes a predetermined amount of rotation of the next adjacent roll dependent upon the amount of rotation previously imparted to the preceding roll. During assembly, certain predetermined relationships must be established between the roll and the transfer mechanism in order to obtain the desired movement therebetween. Furthermore, it is desirable to obtain an initial zero condition with like numerals on the adjacent rolls aligned and having a predetermined orientation.

Consistent establishment of the aforementioned relationships during assembly has been a problem for the maunfacturers of odometers for over fifty years. In general in the prior art, odometers have been assembled more or less by manual operations. Alignment and positioning of the various parts have been the responsibility of the individual worker making the assembly. The parts of the odometer, particularly the transfer mechanism, are relatively quite small and great difficulty has been encountered in handling the devices and placing them in the desired positions. In the past, it has been common experience to find completely assembled odometers improperly assembled upon final inspection, such improper assembly being due solely to the misplacement of a single small transfer pinion only one tooth space within the odometer assembly. Such errors in assembly are not readily apparent by visual inspection either at the time of assembly or upon completion of the odometer assembly whereupon the internal transfer mechanism is hidden from view. The error in assembly, however, is readily apparent upon subsequent operation of the device when the device malfunctions. Needless to say, such assembly problems have caused great consternation in the odometer manufacturing industry.

Accordingly, it is a primary object of the present invention to provide a new and improved odometer.

Another primary object of the present invention is to provide a new and improved odometer having improved assembly features assuring accurate assembly of the various odometer components.

Another object of the present invention is to provide new and improved means of assembling an odometer which will facilitate accuracy in assembly as well as reduce the time required for assembly.

The inventive principles by which the aforementioned objects, and others, have been attained are hereinafter described in detail by reference to the accompanying drawings, in which:

FIGURE 1 is a side elevational view of an assembled odometer illustratively embodying the invention;

FIGURE 2 is an end view of the apparatus shown in FIGURE 1;

FIGURE 3 is another end view of the apparatus shown in FIGURE 1;

FIGURE 4 is a sectional view taken along the line 4—4 in FIGURE 1;

FIGURE 5 is a sectional view taken along the line 5—5 in FIGURE 1;

FIGURE 6 is a cross sectional view taken along the line 6—6 in FIGURE 3;

FIGURE 7 is an enlarged detail view of a portion of the apparatus shown in FIGURE 6;

FIGURE 8 is an enlarged side elevational view of the apparatus shown in FIGURE 7;

FIGURE 9 is a perspective view of a portion of the apparatus shown in FIGURE 1 at an initial stage of assembly;

FIGURE 10 is a perspective view of a portion of the apparatus shown in FIGURE 1 at an intermediate stage of assembly;

FIGURE 11 is another perspective view of a portion of the apparatus shown in FIGURE 1 in another subsequent assembly condition;

FIGURE 12 is another perspective view of a further assembly condition of the apparatus shown in FIGURE 1;

FIGURE 13 is an enlarged detail view, partly in section, of a portion of the apparatus shown in FIGURE 1;

FIGURE 14 is a side elevational view of a portion of an assembly fixture which may be utilized to assemble the odometer shown in FIGURE 1; and FIGURE 15 is a plan view of the apparatus shown in FIGURE 14.

Referring now to FIGURE 1, an indicating mechanism formed by a plurality of assembled rotatable elements is shown and comprises a six indicating element odometer assembly of generally conventional design. An odometer shaft 20 rotatably supports a plurality of indicating elements comprising a tenth mile roll 22, a mile roll 24, a ten mile roll 26, a hundred mile roll 28, a thousand mile roll 30, and a ten thousand mile roll 32. Each of the rolls is provided with suitable spaced numerals around its periphery from, for example, zero to nine. After completion of assembly and prior to installation in a vehicle or the like the rows of numerals are aligned as shown.

A mile gear 34 is mounted on one end of the odometer shaft 20 and, as shown in FIGURE 3, is provided with a plurality of drive shaft apertures 36 which are adapted to receive drive shaft means 38 in the form of stub shafts integrally formed on the end of a hub 39 connected to the tenth mile indicating roll 22. In the illustrative embodiment, there are four such stub shafts and corresponding shaft apertures located in spaced relationship around the periphery of the mile gear 34 approximately 90° apart. Gear 34 is supported by suitable fastening means in abutting engagement with the adjacent end surface of hub 39.

Each of the rolls is separated from the adjacent roll or rolls by partition plate means 40, 41, 42, 44, 46. As shown in detail in FIGURE 4, each partition plate is provided with notched support flange means 48, 50 which are aligned with one another throughout the length of the odometer and provide means for supporting the odometer in assembled position with an automobile speedometer or the like. A radially extending slot 52, shown in FIGURE 11, is located centrally between the flange portions 48, 50. The bottom of the slot 52 is rounded to provide a bearing seat 53, FIGURE 6, for transfer mechanism including a transfer pinion 54. Identical transfer pinions 56, 58, 60, 62 are provided in alignment along the length of the odometer assembly between adjacent rolls. The pinions and rolls are rotatable about parallel axes of rotation. Each pinion comprises a toothed portion 64 having regular equally spaced teeth members engaged with internal teeth 66 in the adjacent portion of the next roll as shown in FIGURE 5. A central cylindrical portion 68, FIGURES 6 and 13, of reduced diameter is rotatably supported on the curved bearing seat 53. The other end of the pinion is provided with a special arrangement of drive teeth 70 and locking teeth 72 which, in association with additional portions of the transfer mechanism to be hereinafter described, provide control means by which the rotation of the rolls is controlled.

Referring now to FIGURES 4 and 10, each roll is provided with an internally located locking rim 76 and a pair of teeth 78, 80 separated by a gap 82 which extends inwardly into and through the locking ring 76. Teeth 78, 80 have a particular alignment relative to the indicia on the rolls and each set of teeth on each roll may, for example, be radially aligned with the numeral zero.

In order for the transfer mechanism to function properly, the pinion must be assembled in the condition shown in FIGURE 4 with one of the locking teeth 72 located in engagement between the internal teeth 78, 80 and with one of the working teeth 78 positioned on either side of the teeth 78, 80 for rotatable driving engagement therewith.

To acquire the desired relationship between the pinion and the internal teeth 78, 80 without fail and without the necessity for relying on visual inspection of each and every pinion assembly by the workmen, assembling means are integrally provided on each pinion. Furthermore, the entire odometer assembly incorporates assembly means facilitating assembly of the pinions in proper relationship with the rolls and of the rolls relative to one another. In order to facilitate automatic assembly without the necessity for manual dexterity and visual inspection, each of the pinions is provided with an assembly means which insures that the proper position will be attained each and every time.

The assembly means takes the form of mateable alignment means provided in part in various components of the odometer assembly and in part by an alignment tool utilized during an assembly operation. The alignment means in the odometer assembly comprise one or more reference surfaces located in a particular manner relative to one or more of the various components of the assembly whereby the desired relationships of the components may be established. In the illustrative embodiment, one of the reference surfaces is formed by the side wall of a centrally located aperture 100 which extends completely through the pinion from end to end parallel to the central axis of rotation. Referring now to FIGURES 7, 8 and 13, aperture 100 is polygonal and generally triangular in cross section and is defined by three intersecting side surfaces 102, 104, 106. In the preferred embodiment, as shown in FIGURE 13, the opening at one end 107 of the aperture is substantially triangular in cross section but the opening at the other end 108 is substantially circular in cross section. The diameter of the circular opening 108 is substantially larger than the altitude of the triangular opening 107 and the connecting interior wall portions are correspondingly tapered. The intersections of the guide surfaces are formed by obliquely extending wall portions 109, 110, 112. Bisectors 114, 116, 118 of each of the angles are aligned with the tooth portions 70, 72 as shown in FIGURE 7. The apex of each angle is aligned with the locking tooth portions 72 so that, if one of the apices points toward the gap 82 between teeth 78, 80 on the roll, a locking tooth 72 will be positioned in the gap 82. Similarly, bisectors 120, 122, 124 of the angles of the triangular aperture are also aligned with the tooth portions 64 on the other side of the pinion as shown in FIGURE 8. Tapered guide openings 126, 128, are provided at each end of the assembly aperture 100.

Each of the rolls 22–32 are also provided with alignment means in the form of a single guide aperture 130, FIGURES 2 and 10, which is located immediately opposite the internal teeth 78, 80. Since the teeth 78, 80 have a particular alignment relative to the indicia on the rolls, each of the apertures 130 also has the particular relationship.

Drive gear 34 is also provided with alignment means in the form of a plurality of guide apertures 140, FIGURE 3, there being four in the preferred embodiment located in equally spaced relationship at 90° relative to the shaft apertures 36. By providing four apertures 140, the initial relationship of the tenth roller 22 relative to the drive gear 34 is not critical and the stub shafts 38 may be positioned in any of the holes 36, at least one of the guide holes 140 being aligned with the guide holes 130 in the rolls.

*Assembly operation sequence*

In order to achieve the assembled relationship shown in FIGURES 1 and 6 with all of the assembly apertures 130 in the rolls aigned from end to end of the assembly with each of the assembly apertures 100 in the pinions and with one of the assembly apertures 140 in the drive gear 34, the sequence of assembly shown in FIGURES 9–11 is preferably utilized. To obtain the desired relationship between the pinions locking teeth 72 and working teeth 70 relative to the internal teeth 78, 80 on the rolls, a triangularly shaped assembly tool 150 is utilized. Tool 150 has a cross-sectional shape and size substantially corresponding to the triangular openings 107 of assembly aperture 100 in each of the pinions and may have a tapered tip facilitating insertion through circular opening 108. Of course, the assembly holes 130, 140 are sufficiently oversized to permit ready insertion of the assembly tool therethrough.

Referring now to FIGURE 9, the odometer shaft 20 and drive gear 34 are shown to be an integral assembly. The first step of the assembly operation comprises insertion of the assembly tool 150 through one of the assembly apertures 140 which also serves to establish the desired relationship between the stub shafts 38 and the drive shaft apertures 36.

The next assembly step, FIGURE 10, comprises positioning the tenth roll 22 over the odometer shaft 20 with the hub 39 extending toward the drive gear 34. The centrally apertured hub portions 39, 152 of the roll 22 are positioned on the end of the odometer shaft 20 and the assembly hole 130 is aligned with the assembly tool 150. After the shaft 20 and tool 150 are positioned in their respective apertures in the roll, roll 22 is slid axially along the shaft 20 until the stub shafts 38 are received within the apertures 36 and hub 39 is seated on gear 34. The relationship of the assembly aperture 130 to the stub shaft extensions 38 and the apertures 36 is such that the stub shafts are immediately received within the holes 36 without further manipulation.

The next step in the operation comprises association of one of the pinions with one of the partitioned plates. The pinion is slid into rotatably supported position with the cylindrical portion 68 within the slot 52 on the bearing seat 53. Then the subassembly of the partitioned plate and the pinion are brought into alignment with the ends of shaft 20 and the tool 150. A central aperture on the partitioned plate is positioned on the shaft 20 and the subassembly is slid axially toward the tool 150. As the pinion approaches the tool 150, the tapered end of the tool enters the tapered portion 128 of the pinion and then the aperture 100 through the circular opening 108. As the tool approaches the triangular opening 107, the pinion is rotated until the triangular aperture 100 is aligned with the triangular assembly tool 150. The partitioned plate and pinion are then slid into abutting engagement with the roll 22 as shown in FIGURE 11. The alignment attained by association of the pinion with the tool locates one of the locking teeth 72 directly in line with the slot 82 and proper meshing engagement of working teeth 70 with the teeth 78, 80 is immediately effected.

The next step in the operation comprises positioning the central aperture of the next roll 24 in alignment with the shaft 20 and the assembly aperture 130 in alingment with the tool 150. The roll is associated with both the shaft and the tool and slid axially into position, FIGURE 12, against the partition plate 40 with the teeth 64 of the pinion 54 in meshing engagement with the internal teeth 66 on roll 24.

The subsequent assembly procedure of the other rolls, partition plates, and pinions is identical to that described in relation to the roll 22, partition plate 40 and the pinion 54. Each succeeding roll and pinion will be identically aligned and positioned with the numerals in alignment as shown in FIGURE 1. After the last roll has been assembled, suitable locking means 160 are associated with the end of the odometer shaft 20 to provide connecting means securing the parts in assembled position. The aligned apertures in each part of the assembly provide passage means extending through the odometer. Thus, access means are provided whereby the alignment tool may be withdrawn upon completion of the assembly operation. Assembly tool 150 may then be withdrawn and the odometer assembly is ready for installation.

It will be appreciated by those skilled in the art to which this invention relates that the aforedescribed methods may be readily adapted to provide semi-automatic and automatic assembly fixtures for carrying out the aforedescribed steps. For example, as shown in FIGURES 14 and 15, such an assembling fixture may illustratively comprise a supporting head 170 mounted on a base plate 172 which may be fixedly supported in any suitable manner. Head 170 includes a recessed annular seat 174 for receiving the drive gear 34-shaft 20 subassembly. Suitable jaw means 176 are provided to clampingly engage the lower end of odometer shaft 20 at 178. Tool 150 may be slidably mounted in suitable guide means extending vertically through the head 170 and plate 172. Suitable coupling means 180 connect tool 150 to a power operable cylinder 182 for extending and retracting the tool. A roll guide bracket 184 may be mounted adjacent the tool 150.

Clamping means for securing the last roll on the top of the odometer and applying the fastening means 160 may be provided by a suitable clamping head (not shown) mounted above the end of the tool 150 and bracket 184. Suitable ejection mechanism 186 for removing the assembled odometer may be operably connected to the jaw actuating linkage 188. A power cylinder 190 is connected to the linkage 188 to move the jaw means and ejection means between extended and retracted positions.

In operation, a gear and shaft subassembly is loaded on the fixture with the drive gear 34 being received on the seat 174. The air cylinder 190 is actuated to move the jaw means into clamping engagement with the end of the shaft 120. The triangular assembly tool 150 extends upwardly through one of the assembly holes 140 in the gear. A tenth roll 22 is loaded over the odometer shaft 20 onto the triangular tool and the stub shafts 38 are positioned in the apertures 36. A transfer pinion 54 is assembled to a partition plate 40 and similarly loaded over the odometer shaft and onto the loading tool. The loading tool automatically aligns a locking tooth 72 of each pinion with the locking ring notch 82 in the adjacent odometer roll. Subsequently, the total rolls 24, 26, 28, 30, 32 are similarly assembled over the odometer shaft and onto the assembly tool with each roll being separated by a partition plate and transfer pin assembly. Finally, the assembly washer 160 is fitted over the end of the odometer shaft and a suitable fixture is brought into alignment with the top of the assembly and is actuated to press the washer into place. At this time the air cylinders 182, 190 are actuated to retract the tool 150 and the jaw means whereupon the completed assembly may be unloaded.

It is contemplated that certain of the inventive principles, hereinbefore disclosed in detail by reference to a presently preferred embodiment of the invention, may be otherwise variously embodied and therefore it is intended that the scope of the appended claims be construed to include those modifications and changes which employ the inventive principles.

What is claimed is:

1. An odometer assembly comprising a plurality of rolls, pinion gear means drivingly interconnecting said rolls, control means to lock said pinion gear means relative to said rolls and having a particular relationship relative to said rolls, passage means extending through said pinion gear means, and at least a portion of said passage means having a non-circular cross-sectional configuration providing a reference surface related in a particular manner to said control means whereby an alignment means is engageable with the reference surface during assembly of the odometer to establish the particular relationship.

2. The invention as defined in claim 1 and wherein said cross-sectional configuration is polygonal.

3. The invention as defined in claim 2 and wherein another portion of said passage means is cylindrical.

4. The invention as defined in claim 3 and wherein said other portion has a tapered approach surface.

5. In an indicating mechanism comprising a plurality of rotatable members rotatable about parallel axes and having a particular relationship relative to one another in an assembled condition, the invention comprising a reference surface on each member establishing the particular relationship by association with mateable alignment means during an assembly operation, access means extending generally parallel to said axes and permitting removal of the mateable alignment means after said assembly operation, and connecting means connecting said rotatable members to one another in the assembled condition and after assembly locating and maintaining said rotatable members in the particular relationship.

6. An odometer comprising:
  odometer support shaft means rotatably supporting a plurality of rolls,
  each roll being provided with spaced numerals around the periphery thereof,
  like ones of said numerals being aligned in an initial condition of the odometer,
  each roll having a ring of internal gear teeth on one side and an internal locking rim having a pair of teeth separated by a gap extending inwardly into and through the locking rim on the other side,
  said gap being aligned with one of the numerals,
  each roll having an axially extending alignment aperture,
  each alignment aperture being equally radially spaced from said support shaft means and being located in radial alignment opposite and adjacent to said gap and opposite and adjacent a space between said internal gear teeth,
  the alignment apertures on said rolls being axially aligned in the initial condition;
  gear means rotatably supported on said support shaft means adjacent an end one of said rolls,
  an axially extending alignment aperture in said gear means radially spaced from said support shaft means and radially aligned with the alignment apertures in said rolls and being axially aligned with the alignment apertures in said rolls in the initial condition;

drive shaft means drivably connecting said gear means to said end one of said rolls, partition plate means mounted about said support shaft means and separating each of said rolls from the next adjacent roll, slot means extending axially through each of said partition plate means and being adapted to rotatably support transfer pinion means, said slot means in each of said partition plate means being radially and axially aligned with one another and with the alignment apertures in said rolls in the initial condition;

a transfer pinion means rotatably supported in each of said slot means, a portion of each of said transfer pinion means having regular equally spaced teeth members engaged with the internal gear teeth on one roll, another portion of each of said transfer pinion means having an arrangement of alternate drive teeth and locking teeth, one of the locking teeth being located in the gap between the pair of teeth on the next adjacent roll and one of the drive teeth being located on each opposite side of the pair of teeth in the initial condition;

and an axially extending alignment aperture centrally located in each of said transfer pinion means and being in axial and radial alignment with one another and with the alignment aperture in said rolls in the initial condition.

7. The invention as defined in claim 6 and wherein said axially extending alignment aperture in the transfer pinion means being polygonal and having at least two side surfaces intersecting one another to define an angle, the bisector of the angle extending radially in alignment with said gap in the initial condition whereby an alignment tool having a correspondingly configured cross section may be associated with the alignment apertures in each of said transfer pinion means in the initial condition to establish a predetermined relationship between the rolls and between the transfer pinion means and the rolls.

8. An odometer assembly comprising:

at least two juxtapositioned relatively rotatable rolls rotatable about a central longitudinal axis and having a plurality of numerals spaced thereabout, said numerals having a predetermined relationship in an initial condition with like numerals being axially aligned;

mounting means on said assembly for mounting said rotatable rolls in a predetermined position;

an axially extending alignment aperture in each of said rolls equally radially spaced from said central longitudinal axis, each alignment aperture having a predetermined relationship to said mounting means and the numerals in the initial condition;

drive gear means mounted on one end of said odometer assembly and being drivably connected to the next adjacent roll, and at least one axially extending alignment aperture in said drive gear means having a predetermined relationship to said mounting means and being aligned with each axially extending aligment aperture in each of said rolls in the initial condition whereby an alignment tool is insertable through said drive gear means and each of said rolls to attain the initial condition.

9. The invention as defined in claim 8 and having pinion means drivably connecting juxtapositioned ones of said rolls, each of said pinion means having an axially extending alignment opening radially aligned with each alignment aperture to said rolls to the initial condition, said pinion means being rotatably mounted about an axis radially spaced from said central longitudinal axis and coinciding with the axially extending alignment opening therein and the axially extending alignment aperture in said rolls.

10. An odometer comprising:

odometer shaft means;

a plurality of odometer rolls rotatably supported on said odometer shaft means in juxtaposition therealong, each roll being provided with suitably spaced numerals around the periphery and said rolls being relatively rotatable from an initial zero condition with like numerals aligned;

a drive gear mounted on said odometer shaft means and having a plurality of drive shaft apertures;

a constantly driven indicating roll mounted next adjacent said drive gear, a hub portion provided on said constantly driven indicating roll and a plurality of stub shafts connected to said hub portion and mounted in said drive shaft apertures;

transfer pinion means mounted in alignment along the length of the odometer assembly between adjacent rolls, each pinion comprising a toothed portion engaged with internal teeth in the adjacent portion of the next roll, each pinion being further provided with an arrangement of drive teeth and locking teeth which must be assembled in a particular manner in order for the transfer pinion means to function properly;

assembly means for properly positioning said transfer pinion means comprising a centrally located aperture extending completely through each transfer pinion means from end to end parallel to the central axis of rotation, said centrally located aperture having a cross-sectional configuration providing a reference surface, the geometry of said centrally located aperture being related to the position of said transfer pinion means so that when said centrally located aperture of each of said pinion means is geometrically aligned with the centrally located aperture of the other transfer pinion means each of said transfer pinion means will be assembled in the particular manner required for proper functioning of the transfer pinion means;

each of said rolls being provided with a guide aperture being related to said numerals so as to be located in alignment with said centrally located aperture in the initial position;

and guide aperture means in said drive gear for alignment with the guide apertures in said rolls and the centrally located aperture in said transfer pinion means to enable an alignment shaft to be inserted through each of said transfer pinion means and each of said rolls during assembly to properly position said transfer pinion means and said rolls in the initial condition, and said alignment shaft being removable after assembly.

11. The invention as defined in claim 10 and each of said rolls having a pair of teeth with a gap therebetween for association with said transfer pinion means, and said assembly further comprising said centrally located aperture being generally triangular in cross section and defined by three intersecting surfaces, the apex of each angle defined by said intersecting side surfaces being aligned with the locking tooth portions so that if one of the apices points toward the gap between the teeth on the roll, a locking tooth will be positioned in the gap.

12. An odometer comprising:

a plurality of indicating rolls, each of said rolls having a plurality of numerals spaced about the periphery,
a transfer mechanism connecting each of the rolls to cause a predetermined amount of rotation of the next adjacent roll dependent upon the amount of rotation previously imparted to the preceding roll,
said rolls and said transfer mechanism having an initial zero condition with like numerals on adjacent rolls aligned and having a predetermined orientation;
means for establishing said initial zero condition and said predetermined orientation of said rolls comprising:
an assembly means in the form of a reference surface on each transfer mechanism extending generally parallel to the central axis of rotation of said rolls,
and said reference surface being positioned and related to said transfer mechanism so that said initial zero condition and said predetermined orientation are attained when the reference surfaces of each transfer mechanism are aligned.

13. The invention as defined in claim 12 and wherein said assembly means being in the form of an aperture extending through each transfer mechanism parallel to the central axis of rotation of said rolls, and said aperture having a cross-sectional configuration providing said reference surface.

14. The invention as defined in claim 13 and the aperture being generally triangular in cross section and defined by three intersecting side surfaces.

15. An odometer assembly comprising:
at least two juxtapositioned relatively rotatable rolls having a plurality of numerals formed thereabout,
said numerals having a predetermined relationship in an initial condition subsequent to assembly and prior to use,
one of said rolls having a ring of internal teeth provided therearound,
the other of said rolls having an internal locking rim provided therearound,
a pair of teeth provided adjacent said locking rim and being separated by a gap extending inwardly into and through said locking rim,
a pinion rotatably mounted between and drivably interconnecting said rolls for intermittent actuation of one roll by the other roll,
a portion of said pinion having a ring of equally spaced tooth members engaged with the rim of internal teeth on said one of said rolls,
another portion of said pinion having an arrangement of alternating drive teeth and locking teeth,
said pinion and said rolls being assembled in a predetermined relationship for successive actuation of said rolls from the initial condition with one of the locking teeth located in engagement in the gap between the pair of teeth and with one of the drive teeth positioned on opposte sides of the pair of teeth,
an alignment aperture formed in each of said rolls adjacent and in radial alignment with the gap between the pair of teeth,
said alignment aperture in each of said rolls having a common relationship to the numerals formed on said rolls so that when the alignment apertures are aligned the numerals on each roll are in predetermined relationship relative to one another for successive actuation of said rolls from the initial condition,
and an alignment aperture formed in said pinion and being radially aligned with the alignment aperture in each of said rolls in the initial condition,
said alignment aperture formed in said pinion having a reference portion fixedly located relative to said drive teeth and said locking teeth whereby the initial condition is established when said reference portion is located in a predetermined manner relative to said gap,
one of said locking teeth being located in the gap and drive teeth being located on opposite sides of the pair of teeth,
and when the alignment apertures in said rolls are axially aligned with the alignment aperture in said pinion, the numerals formed on said rolls then having the predetermined relationship relative to one another.

16. The invention as defined in claim 15 and wherein said reference portion of said alignment aperture in said pinion comprising a flat surface adapted to correspond to an alignment tool insertable through the alignment aperture in the initial condition.

17. The invention as defined in claim 15 and wherein said drive teeth and said locking teeth comprising at least two of each equally spaced around the periphery of said pinion,
said reference portion of said alignment aperture being located opposite one of said locking teeth so that when said reference portion is radially aligned with said gap said one of said locking teeth being located in said gap.

18. The invention as defined in claim 15 and wherein said drive teeth and said locking teeth comprising at least two of each equally alternately spaced around the periphery of said pinion;
said alignment aperture in said pinion being polygonal.

19. The invention as defined in claim 18 and said reference portion being formed by the sides of said polygonal aperture.

20. The invention as defined in claim 18 and the sides of said polygonal aptreure defining acute angles with one another, and a bisector of one of said acute angles being radially aligned with said gap.

21. The invention as defined in claim 18 and said polygonal aperture having a number of sides equal to the number of locking teeth.

22. The invention as defined in claim 21 and said polygonal aperture providing a number of acute angles equal to the number of locking teeth and each of said acute angles being located radially opposite one of said locking teeth.

23. The invention as defined in claim 22 and wherein the number of locking teeth is three, the number of acute angles is three,
and the alignment aperture in said pinion is triangular.

24. An odometer assembly comprising:
at least two juxtapositioned relatively rotatable rolls,
one of said rolls having a ring of internal teeth provided therearound,
the other of said rolls having an internal locking rim,
a pair of teeth provided adjacent said locking rim and being separated by a gap extending inwardly into and through said locking rim,
a pinion drivably connecting said rolls for intermittent actuation of one by the other,
a portion of said pinion having a ring of equally spaced tooth members engaged with the rim of internal teeth on said one of said rolls,
another portion of said pinion having an arrangement of alternating drive teeth and locking teeth,
said pinion being assembled with one of the locking teeth located in engagement in the gap between the pair of teeth and with one of the drive teeth positioned on opposite sides of the pair of teeth,
and an alignment aperture formed in said pinion,
said alignment aperture having a portion fixedly located in relationship with one of said teeth so that upon association of said alignment aperture with an alignment fixture during assembly said one of said teeth will be prepositioned for assembly of said pinion with said rolls with one of the locking teeth located in engagement in the gap between the pair of teeth and with one of the drive teeth on opposite sides of the pair of teeth.

25. The invention comprising an odometer formed of an assembly of relatively rotatable indicating elements and drive elements therefor, there being an assembly position in which the drive elements are properly positioned relative to the rotatable indicating elements and an assembly position in which the drive elements are improperly positioned relative to the rotatable indicating elements, said relatively rotatable indicating elements and said drive elements being rotatable about parallel axes of rotation, each of said relatively rotatable indicating elements and said drive elements having an alignment aperture extending therethrough parallel to said axes of rotation, and the alignment apertures in said rotatable indicating elements being located in corresponding radial positions relative to said axes of rotation and being positionable in alignment with one another to establish the proper assembly position and an initial indicating condition when aligned with one another.

26. An odometer having a plurality of relatively rotatable indicating elements variably rotatable about a central longitudinal axis of rotation, means rotatably supporting said rotatable indicating elements for variable rotation relative to one another from an initial zero indicating condition, each indicating element having an alignment aperture extending parallel to the axis of rotation, and the alignment apertures being positioned and arranged for establishing the initial zero indicating condition when the alignment apertures on each element are alignd with one another.

References Cited

UNITED STATES PATENTS

| | | | |
|---|---|---|---|
| 1,577,069 | 3/1926 | Olsen | 235—96 |
| 1,671,553 | 5/1928 | Sheldrick | 235—1.3 |
| 1,950,617 | 3/1934 | Lee | 235—96 |
| 2,077,666 | 4/1937 | Bliss | 235—95 |

FOREIGN PATENTS 736,089  9/1932  France.

RICHARD B. WILKINSON, *Primary Examiner.*

S. A. WAL, *Assistant Examiner.*